United States Patent
Conner, Sr.

(10) Patent No.: US 8,030,596 B1
(45) Date of Patent: Oct. 4, 2011

(54) KNIFE WITH HEATED BLADE AND METHOD

(75) Inventor: Michael E. Conner, Sr., Petersburg, VA (US)

(73) Assignee: C & W Container Corp., Petersburg, VA (US)

( * ) Notice: Subject to any disclaimer, the term of this patent is extended or adjusted under 35 U.S.C. 154(b) by 220 days.

(21) Appl. No.: 12/464,332

(22) Filed: May 12, 2009

(51) Int. Cl.
- *B26D 7/10* (2006.01)
- *B26B 3/00* (2006.01)
- *B26B 5/00* (2006.01)
- *B26B 11/00* (2006.01)

(52) U.S. Cl. .......................... 219/229; 219/242; 30/140

(58) Field of Classification Search .................. None
See application file for complete search history.

(56) References Cited

U.S. PATENT DOCUMENTS

| | | | | |
|---|---|---|---|---|
| 2,574,440 | A * | 11/1951 | Smith et al. | 30/140 |
| 2,600,067 | A * | 6/1952 | Merodian | 30/314 |
| 2,896,059 | A * | 7/1959 | Ruff | 30/140 |
| 2,972,035 | A * | 2/1961 | Miller | 30/140 |
| 3,365,797 | A * | 1/1968 | Cook | 30/140 |
| 3,723,704 | A * | 3/1973 | Silverthorne | 219/242 |
| 3,892,024 | A * | 7/1975 | Van Zyl | 30/140 |
| 4,219,025 | A * | 8/1980 | Johnson | 606/31 |
| 5,743,017 | A * | 4/1998 | Dreher et al. | 30/140 |
| 6,367,155 | B2 * | 4/2002 | Homann | 30/140 |
| 2001/0027968 | A1* | 10/2001 | Stuart | 219/233 |
| 2006/0191386 | A1* | 8/2006 | Vanden Heuvel | 83/13 |
| 2008/0083309 | A1* | 4/2008 | Lothian | 83/15 |

FOREIGN PATENT DOCUMENTS

| | | | |
|---|---|---|---|
| DE | 29816046 U1 * | 4/1999 | |
| FR | 2481983 A * | 11/1981 | |
| FR | 2560103 A * | 8/1985 | |
| GB | 1146714 A * | 3/1969 | |
| JP | 08047900 A * | 2/1996 | |

* cited by examiner

*Primary Examiner* — Joseph M Pelham

(57) ABSTRACT

A handheld knife includes an electric powered heater for raising the temperature of the knife blade for cutting and melting thermoplastics and the like. Two embodiments of the knife are shown, one for standard 120 volt AC current and one which includes a 24 volt battery pack. The method of use describes the steps of selecting an item for cutting, heating the knife blade by depressing a switch thereon and then manually drawing the knife blade across the item to cut selected materials.

16 Claims, 3 Drawing Sheets

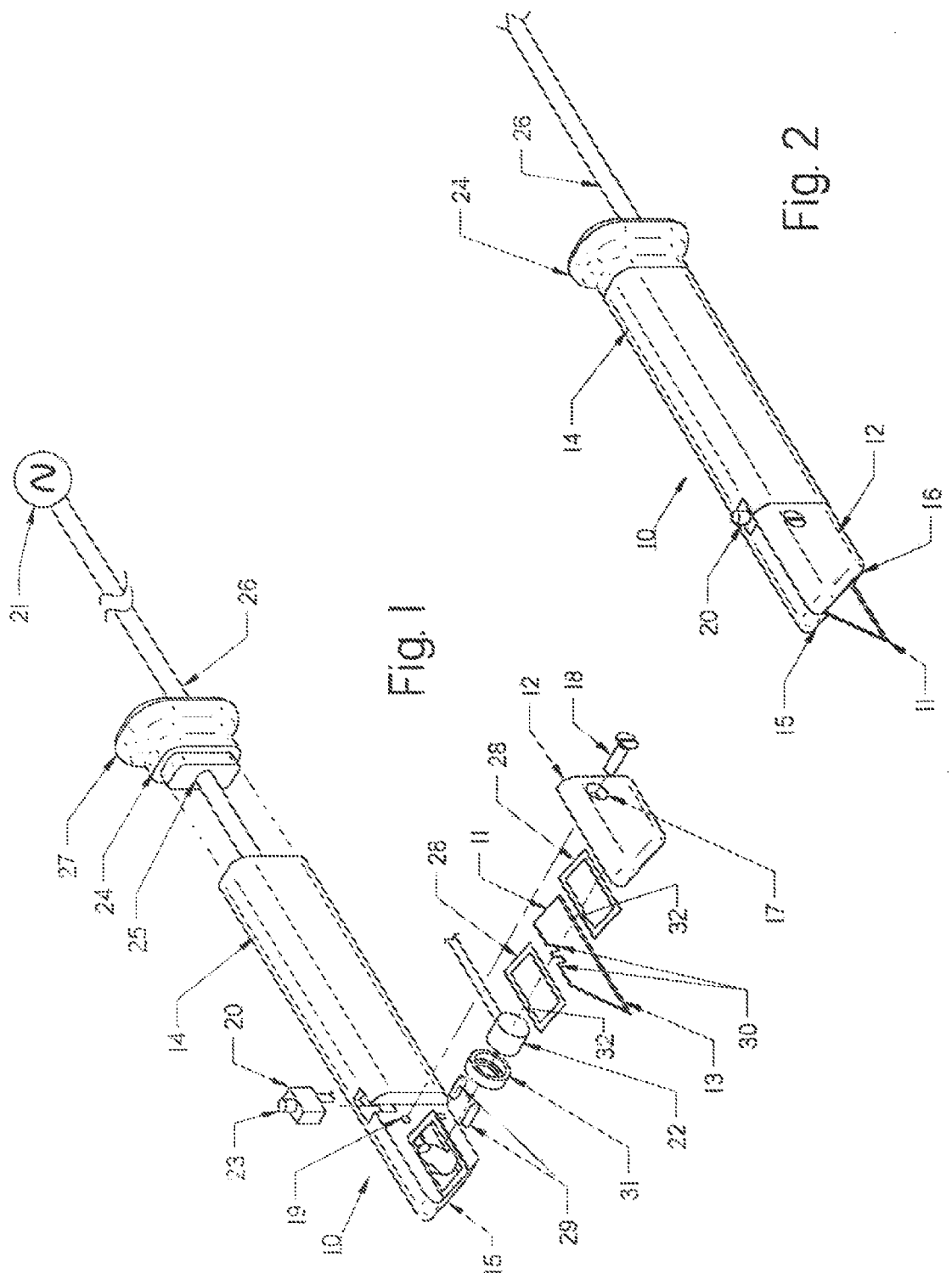

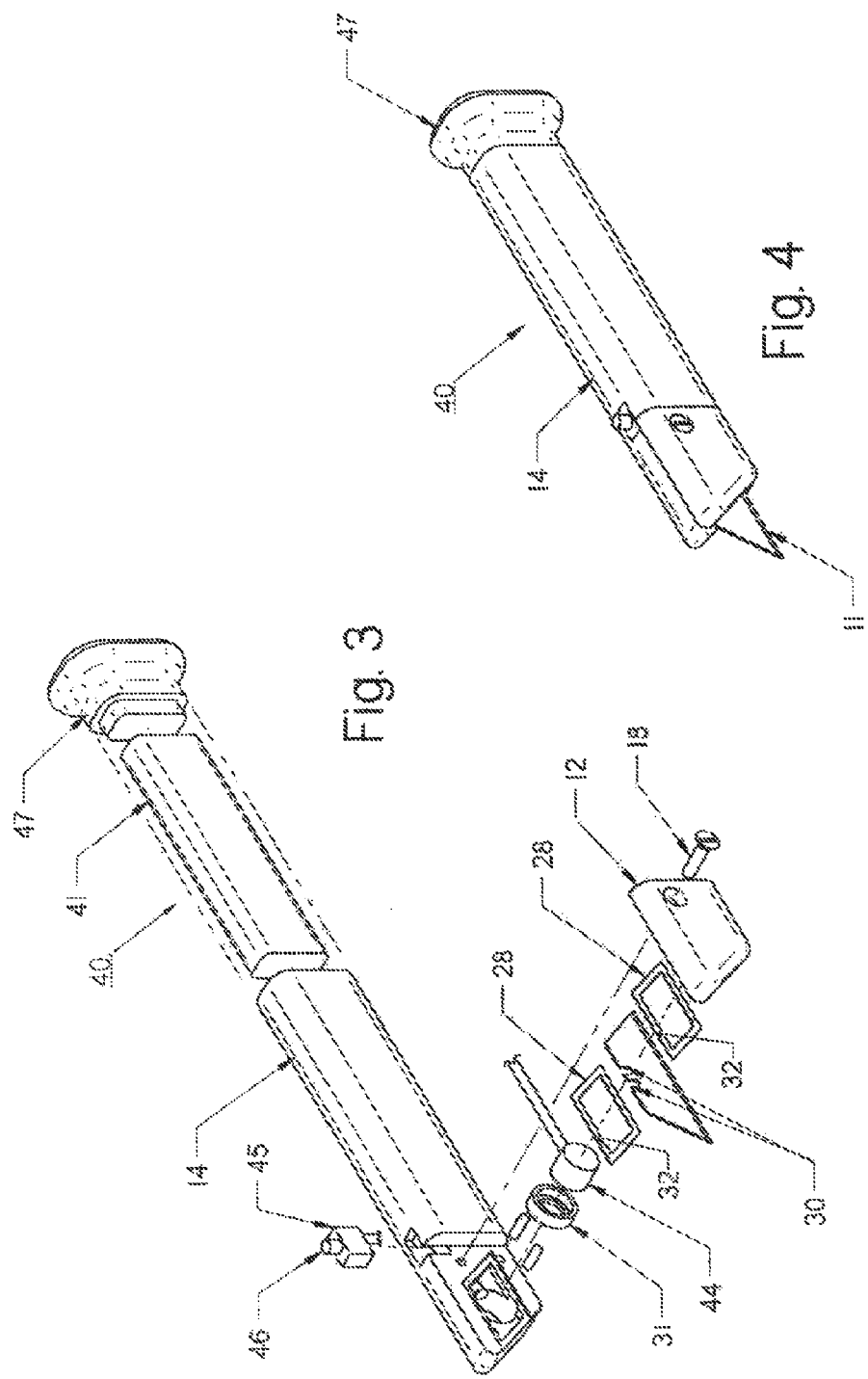

KNIFE WITH HEATED BLADE AND METHOD

FIELD OF THE INVENTION

The invention herein pertains to knives that are used for cutting construction materials such as floor tiles, roof tiles and the like and particularly pertains to knives with heated blades.

DESCRIPTION OF THE PRIOR ART AND OBJECTIVES OF THE INVENTION

With the cost of labor and construction services accelerating in recent years, contractors, builders and workmen are all interested in decreasing the time spent in completing work. Tradesmen that lay polymeric flooring or roof tiles must constantly cut and trim the tiles for a proper fit. Standard razor knives are used in this regard but certain tiles tend to quickly "gum" the knife blade while other types of tile materials rapidly dull the blade. Once the blade is dull or gummed it must be replaced or maintained, slowing the job progress.

Thus with the problems and disadvantages associated with typical hand held cutting knives the present invention was conceived and one of its objectives is to provide a knife having a heated blade and method of use for increasing the speed and efficiency of cutting and trimming polymeric building and other materials.

It is another objective of the present invention to provide a knife having a heated blade which does not have to be cleaned and maintained as often as standard non-heated blades.

It is still another objective of the present invention to provide two embodiments of a handheld knife having a heated blade, the first embodiment having an electrical cord for use with alternating current and a second embodiment having a battery pack for use at a remote site such as on a roof.

It is a further objective of the present invention to provide a knife with a heatable blade which is relatively inexpensive to manufacture and sell.

Various other objectives and advantages of the present invention will become apparent to those skilled in the art as a more detailed description is set forth below.

SUMMARY OF THE INVENTION

The aforesaid and other objectives are realized by providing a handheld knife having a sheath made of a standard materials such as suitable plastics, metals or composites. The sheath is fitted with a heater, switch and in the preferred form includes a 120 volt electrical cord. In an alternate embodiment of the apparatus a battery pack is provided for power. In use, a switch energizes an electrical resistance heater contained within the sheath contiguous the cutting blade. As the blade is heated, the switch can be released once a desired temperature is reached. The blade is a standard industrial steel razor blade and a sheath cover having a single screw allows the blade to be quickly removed, reversed or replaced. The method of use includes heating the blade and then manually drawing it across planar thermoplastic materials such as floor or roof tiles. The blade provides a cutting/melting effect on the tile or other thermoplastic items and helps prevent debris buildup along the blade.

BRIEF DESCRIPTION OF THE DRAWINGS

FIG. 1 shows an exploded perspective view of the preferred form of the invention;

FIG. 2 demonstrates the knife and heated blade as shown in FIG. 1 in assembled form;

FIG. 3 illustrates an alternate embodiment of the invention in an exploded perspective view;

FIG. 4 depicts the knife and heated blade as shown in FIG. 3 in assembled form;

DETAILED DESCRIPTION OF THE PREFERRED EMBODIMENT AND OPERATION OF THE INVENTION

Figure 5:
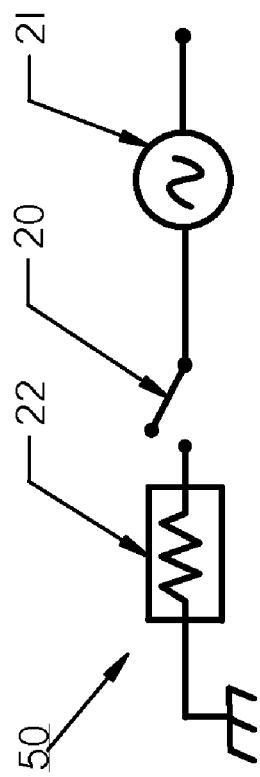
FIG. 5 pictures an electric schematic of the knife with an alternating current source.

For a better understanding of the invention and its method of operation, turning now to the drawings, FIG. 1 shows preferred knife 10 having heatable blade 11 as demonstrated in exploded fashion for clarity. Blade 11 is a standard razor blade sold for box cutters and other knives. As would be understood, blade 11 is not fully exposed while in sheath 14 and can be reversed should a portion of exposed blade edge 13 become dull. Preferably sheath 14 and cover 12 of knife 10 are formed from a suitable, durable polymeric material such as polycarbonate although sheath 14 could be made from other plastics, conventional metals or composites as could cover 12. Sheath 14 includes a biased front 15 for exposure of blade 11 as seen in FIG. 2. Front edge 16 of cover 12 is also biased to similarly accommodate exposure of blade 11.

Cover 12 is preferably formed from the same material as sheath 14 and includes aperture 17 for receiving threaded member 18. Threaded member 18 is a standard bolt which is received within aperture 17 of cover 12 and into threaded channel 19 of sheath 14 to maintain blade 11 therein. Threaded member 18 can be easily inserted and removed such as during maintenance or replacement of blade 11.

Switch 20 seen in FIGS. 1 and 2 is a typical "momentary" switch such as model No. 8185K11 sold by McMaster Carr of Princeton, N.J. which allows electricity from a standard AC source as shown schematically in FIG. 5 at electric source 21 to communicate with standard heater 22. Finger button 23 is provided on switch 20 for operation thereof. Heater 22 is a conventional small, electrical resistance heater such as model No. H075-30-24-01, sold by Sun Electric Heater Company of Danvers, Mass. Heater 22 is thermally insulated by heater insulator 31 formed from Millboard (McMaster Carr 9362K12) to decrease energy loss and prevent sheath 14 from becoming hot while in use. While 120 volt AC current is preferred, other voltages such as 220 volts may be utilized as desired. Cap 24 shown in FIG. 1 is exploded from sheath 14 and includes aperture 25 to allow electric supply cord 26 to pass therethrough. Cap 24 includes flange 27 which allows a user to securely grasp and maintain sheath 14 during the cutting process. Insulators 28 shown in FIG. 1 fit within cover 12 and sheath 14 on each side of blade 11. As cover 12 is tightened to sheath 14, insulators 28 press against blade 11 which insures proper, full contact between blade 11 and heater 22 for frictional engagement and superior heat conduction to blade 11. Insulator 28 is formed from a standard gasket material and includes gap 32 for ease in placement on each side of blade edge 13. Preferably one insulator 28 is adhered with a suitable glue to sheath 14 and the other insulator 28 is adhered by the suitable glue to the inside of cover 12. Pins 29 are mounted within sheath 14 to insure proper alignment and stability of blade 11 as pins 29 are received by grooves 30 in blade 11 when fully assembled.

In FIG. 2, knife 10 is shown assembled and available for use. The method of use includes first connecting supply cord 26 to a 120 volt AC outlet. Button 23 of switch 20 is then depressed allowing current to flow to heater 22 which is in contact with metal blade 11. Blade 11 is then heated by heat flow from resistance heater 22. A desired material such as a planar thermoplastic sheet, tile or the like is first selected and placed on a suitable table or other work surface. The user then manually draws heated knife blade 11 along a prescribed route on the tile or other material to cut and/or melt the same. Switch 20 can be turned off by releasing button 23 but for thicker materials may remain on during the entire cutting stroke. The electrical schematic in FIG. 5 shows circuitry 50 employed with knife 10.

Figure 6:
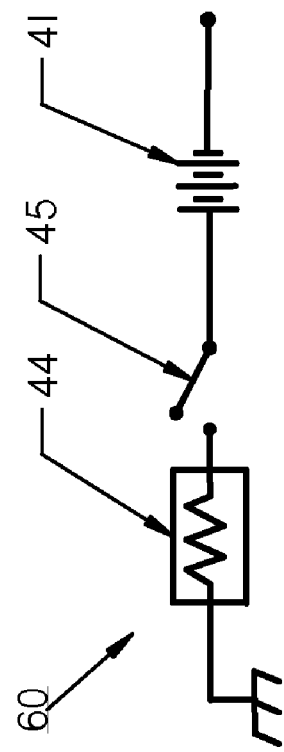
FIG. 6 shows an electric schematic of the alternate embodiment of the invention using direct current.

An alternate embodiment of the knife apparatus is shown in FIGS. 3 and 4 by knife 40 which utilizes battery pack 41. Battery pack 41 includes a conventional lithium or other type battery having a voltage of 24v for powering heater 44 as may be purchased from All-Battery.com of Sunnyvale, Calif. as model No. NIMH-24V-2000BL. As would be understood, switch 45 is activated by finger button 46 which is electrically connected to battery pack 41 and to resistance heater 44. By holding button down, heater 44 receives energy and heats blade 11 by conduction. Cap 47 is comparable to cap 27 as shown in preferred knife 10 however, cap 47 does not include an aperture for an electrical supply cord. Assembled knife 40 is shown in FIG. 4 and its method of use is identical to that described regarding preferred knife 10. An electrical schematic as seen in FIG. 6 shows direct current circuitry 60 as used for knife 40.

As would be understood, by utilizing heat, heated blade 11 when in use can be easily wiped clean to remove any "gum", "tar", etc. as would be encountered when cutting various materials such as polymeric flooring, roof tiles, etc. The heat allows for easier cutting as it prevents the materials from sticking to blade 11. Therefore, blade 11 does not "hang" in the material but rather slides through as the blade simultaneously cuts and melts the material.

The illustrations and examples provided herein are for explanatory purposes and are not intended to limit the scope of the appended claims.

I claim:

1. A knife comprising: a sheath, a blade, said blade contained within said sheath, a pair of blade insulators, each of said pair of blade insulators positioned on different sides of said blade, a cylindrically shaped resistance heater, a heater insulator, said heater insulator receiving said resistance heater, a power source, said resistance heater connected to said power source, and said resistance heater contained within said sheath contiguous said blade.

2. The knife of claim 1 wherein each of said pair of blade insulators defines a gap, said gap to facilitate placement thereof, a pair of pins, said pair of pins contained within said sheath for proper blade alignment within said sheath.

3. The knife of claim 1 further comprising a cap, said cap affixed to said sheath to help secure the knife during use, and a switch, said switch connected to said resistance heater.

4. The knife of claim 1 further comprising a cover, said cover removably positioned on said sheath to hide said blade.

5. The knife of claim 1 wherein said power source comprises a battery.

6. The knife of claim 1 wherein said power source comprises 120 volt alternating current.

7. The knife of claim 4 wherein said sheath defines a biased front, said biased front to allow exposure of said blade, said cover defines a biased edge, said biased edge aligned with said biased front.

8. The knife of claim 7 further comprising a threaded member, said cover defining an aperture, said sheath defining a threaded aperture, said threaded member positioned in said cover aperture and in said sheath aperture to secure said cover to said sheath.

9. The knife of claim 3 further comprising a flange, said flange attached to said cap to secure the user's grasp during use.

10. The knife of claim 9 wherein said flange defines an opening, an electrical cord, said electrical cord contained within said opening, said electrical cord connected to said resistance heater.

11. The knife of claim 1 wherein said blade defines a pair of grooves, a pair of pins, each of said pair of pins positioned in different ones of said pair of grooves to stabilize said blade within said sheath.

12. A method of cutting a thermoplastic material using a hand held knife with a heated blade comprising the steps of:
   a) providing a knife having a sheath, a blade, said blade contained within said sheath, a pair of gapped blade insulators, each of said pair of gapped blade insulators positioned on different sides of said blade, a cylindrically shaped resistance heater, a heater insulator, said heater insulator receiving said resistance heater, a power source, said resistance heater connected to said power source, and said resistance heater contained within said sheath contiguous said blade;
   b) heating the blade using the power source connected to the resistance heater;
   c) selecting a material to be cut; and
   d) drawing the heated knife blade along the material to cut the material.

13. The method of claim 12 wherein heating the blade comprises the step of heating the blade using a battery as a power source.

14. The method of claim 12 wherein heating the blade comprises the step of heating the blade using alternating current as a power source.

15. The method of claim 12 wherein selecting a material comprises the step of selecting a planar thermoplastic material.

16. The method of claim 12 wherein drawing the knife blade comprises the step of manually drawing the knife blade along the material.

* * * * *